United States Patent
Steinberg et al.

(10) Patent No.: US 7,267,781 B2
(45) Date of Patent: *Sep. 11, 2007

(54) METHOD OF FABRICATING OPTICAL FILTERS

(75) Inventors: Dan A. Steinberg, Blacksburg, VA (US); Mindaugas F. Dautartas, Blacksburg, VA (US); David W. Sherrer, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 153 days.

This patent is subject to a terminal disclaimer.

(21) Appl. No.: 10/871,689

(22) Filed: Jun. 2, 2004

(65) Prior Publication Data
US 2005/0003665 A1    Jan. 6, 2005

Related U.S. Application Data (62) Division of application No. 09/862,037, filed on May 21, 2001, now Pat. No. 6,768,590.

(60) Provisional application No. 60/205,973, filed on May 19, 2000.

(51) Int. Cl.
B29D 11/00   (2006.01)
H01L 21/00   (2006.01)

(52) U.S. Cl. ............... 216/24; 216/2; 216/41; 216/83; 385/14; 359/350

(58) Field of Classification Search ............ 216/2, 216/24, 41, 83; 359/350; 385/14
See application file for complete search history.

(56) References Cited

U.S. PATENT DOCUMENTS

| | | | |
|---|---|---|---|
| 3,853,650 A | 12/1974 | Hartlaub | |
| 3,893,228 A | 7/1975 | George et al. | |
| 4,203,128 A | 5/1980 | Guckel et al. | |
| 4,234,361 A | 11/1980 | Guckel et al. | |
| 4,446,543 A | 5/1984 | McLandrich et al. | |
| 4,597,003 A | 6/1986 | Aine et al. | |
| 4,682,500 A | 7/1987 | Uda | |
| 4,825,262 A | 4/1989 | Mallinson | |
| 4,926,696 A | 5/1990 | Haritonidis et al. | |
| 4,933,545 A | 6/1990 | Saaski et al. | |
| 4,942,767 A | 7/1990 | Haritonidis et al. | |
| 5,022,745 A | 6/1991 | Zayhowski et al. | |
| 5,144,498 A | 9/1992 | Vincent | |
| 5,247,490 A | 9/1993 | Goepel et al. | |
| 5,262,021 A * | 11/1993 | Lehmann et al. | 205/655 |
| 5,381,231 A | 1/1995 | Tu | |
| 5,425,115 A | 6/1995 | Wagner | |
| 5,426,070 A * | 6/1995 | Shaw et al. | 216/2 |
| 5,544,772 A * | 8/1996 | Soave et al. | 216/2 |
| 5,600,070 A | 2/1997 | Wlodarczyk | |
| 5,619,046 A | 4/1997 | Engstrom et al. | |
| 5,645,684 A * | 7/1997 | Keller | 148/33.2 |
| 5,654,819 A | 8/1997 | Goossen et al. | |
| 5,739,945 A | 4/1998 | Tayebati | |

(Continued)

*Primary Examiner*—Shamim Ahmed
(74) *Attorney, Agent, or Firm*—Jonathan D. Baskin (57) ABSTRACT

A method of fabricating optical filter is disclosed. The method includes providing the substrate and selectively etching the substrate to form a plurality of freestanding layers. A plurality of dielectric layers is disposed over an outer surface of each of the freestanding layers. The resultant optical filters may be used in a variety of applications including etalon applications.

26 Claims, 6 Drawing Sheets

U.S. PATENT DOCUMENTS

| | | |
|---|---|---|
| 5,920,391 A | 7/1999 | Grasdepot et al. |
| 5,943,155 A | 8/1999 | Goossen |
| 6,014,251 A * | 1/2000 | Rosenberg et al. ......... 359/350 |
| 6,085,002 A | 7/2000 | Qiu et al. |
| 6,768,590 B2 * | 7/2004 | Steinberg et al. ........... 359/577 |

* cited by examiner

ND OF FABRICATING OPTICAL
METHOD OF FABRICATING OPTICAL FILTERS

CROSS-REFERENCE TO RELATED APPLICATIONS

This is a divisional application of application Ser. No. 09/862,037, filed May 21, 2001, now U.S. Pat. No. 60/768, 590, which claims the benefit of priority of U.S. Provisional Patent Application Ser. No. 60/205,973, entitled "Method for Making Optical Filters", filed May 19, 2000, the entire contents of which application(s) are incorporated by reference herein.

FIELD OF THE INVENTION

The present invention relates generally to optical filters, and particularly to a method of making multi-layer stack dielectric filters.

BACKGROUND OF THE INVENTION

Coatings of thin dielectric films are useful in a variety of optical applications. For example, multi-layer dielectric thin-film coatings are often used to eliminate unwanted reflection (i.e., anti-reflective coatings) from surfaces in a variety of applications in the optical arts. Beam splitters and dichroic mirrors are useful in many optical applications, and may benefit from multi-layer dielectric stacks.

One well-known example of a multi-layer stack of dielectric thin-films is a quarter-wave stack. The quarter-wave stack is made up of a number of dielectric layers having an optical thickness corresponding to one-quarter wavelength of a particular chosen wavelength. Typically, the layers of dielectric material have alternating high and low indices of refraction. Light is usually incident normal to the surface of the quarter wavelength stack. However, angles of incidence other than the normal, up to approximately 30°, may be used with very little degradation in the response of the dielectric stack. In general, the effect of increasing the angle of incidence relative to the normal is a shift in the reflectance curve down to slightly shorter wavelengths.

Often, the layers of dielectric materials of a multi-layer dielectric stack optical filter have indices of refraction and thicknesses chosen to be transmissive of a desired wavelength. The desired wavelength of light will be transmitted, while all other wavelengths will be substantially reflected.

As the optical communication industry applies the dielectric thin-films stack in a variety of applications, there is an increasing demand for a technique to fabricate dielectric thin-films stacks en masse in a reliable manner.

SUMMARY OF THE INVENTION

According to an illustrative embodiment, a method of fabricating optical filters includes providing a substrate, selectively etching the substrate to form a plurality of freestanding layers, and depositing a plurality of dielectric layers over an outer surface of each of the freestanding layers.

According to another illustrative embodiment, an optical etalon includes at least two freestanding layers disposed between handles. A plurality of dielectric layers is disposed over each of the freestanding layers.

According to another illustrative embodiment of the present invention, a method of fabricating an optical etalon includes providing a substrate and selectively etching the substrate to form at least one freestanding layer. A plurality of dielectric layer is deposited over the freestanding layer on opposed sidewalls thereof.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Figure 1:
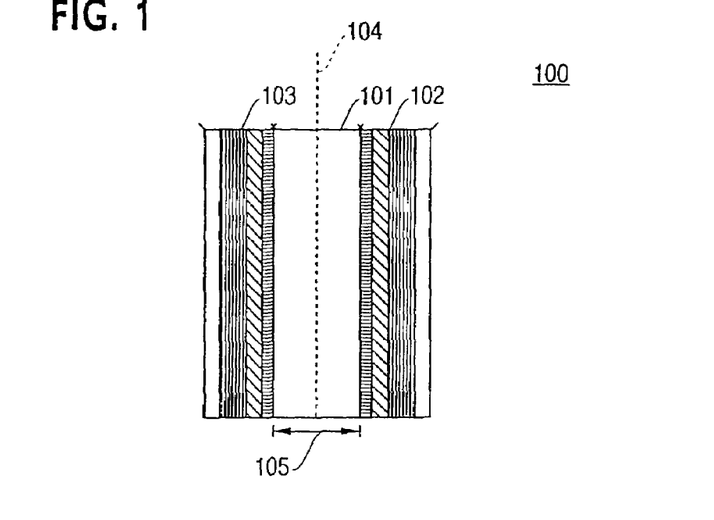
FIG. 1 is a cross-sectional view of an optical filter in accordance with an illustrative embodiment of the present invention.

FIG. 1 shows a cross-sectional view of an optical filter 100 having dielectric film stacks 102 and 103 disposed on either side of a freestanding layer 101. The dielectric film stacks 102 and 103 are illustratively a plurality of thin dielectric films disposed on either side of freestanding layer 101. The filter 100 is substantially symmetric about an axis 104 which bisects the freestanding layer 101. As explained in further detail herein, the filters are substantially symmetric because they are fabricated on freestanding layers using a conformal coating process.

The filter 100 may be used for a variety of applications, particularly in the optical arts. Illustratively, the filters may be used as narrow and wide band-pass filters, anti-reflection coatings and etalons. Still other applications of the filter 100 of the illustrative embodiment shown in FIG. 1 would be readily apparent to one having ordinary skill in the art.

The freestanding layer 101 is illustratively silicon and has a thickness which may have many values. For example, the freestanding layer 101 may have a thickness 105 in the range of approximately 1 μm to approximately 10 μm or greater.

Moreover, in certain applications the thickness of the freestanding layer 101 may be less than 1 μm. The dielectric film stacks 102 and 103 may be a plurality of individual dielectric layers having thicknesses and indices of refraction, which are application specific. Moreover, the number of dielectric layers needed to form dielectric film stacks 102 and 103 is also application specific. For example, in a variety of optical filter applications, the number of dielectric layers disposed on each side of the. freestanding layer 101 may be between 10 and 100 layers.

The dielectric film stacks 102 and 103 are illustratively conformally, sequentially deposited over the freestanding layer 101. Illustrative techniques for depositing dielectric film stacks 102 and 103 include atomic layer deposition (ALD), chemical vapor deposition (CVD), low pressure chemical vapor deposition (LPCVD), plasma enhanced chemical vapor deposition (PECVD), metal-organic chemical vapor deposition (MOCVD) or the like. Moreover, the dielectric thin films which make up dielectric thin film stacks 102 and 103 include but are not limited to metal oxides such as aluminum oxide, titanium oxide, silicon oxide, cesium oxide, tantalum pentoxide, and other metal-oxides well known to one having ordinary skill in the art. Moreover, other thin-film dielectric materials used for optical applications may be used to fabricate dielectric film stacks 102 and 103. These are deposited by techniques well known to one having ordinary skill in the art of optical filters. An illustrative technique for fabricating the dielectric filter 100 of the illustrative embodiment of FIG. 1 is described presently.

Figure 2:
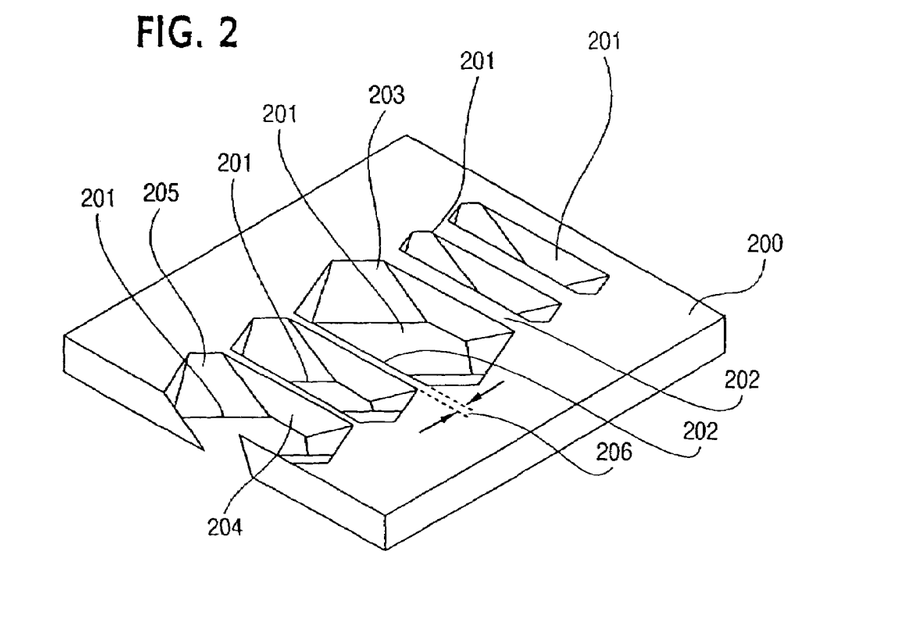
FIG. 2 is a perspective view of a substrate having selectively etched openings therein in accordance with an illustrative embodiment of the present invention.

Turning to FIG. 2, a substrate 200 has openings 201 formed therein. The substrate 200 is illustratively a monocrystalline material, such as <110> silicon. Openings 201 are fabricated using standard etching techniques, which are typically anisotropic wet-etching techniques well known to one having ordinary skill in the art. The etching results in the formation of a plurality of freestanding layers 202 disposed between openings 201. As can be seen, sidewalls 203 are also formed during etching. The freestanding layers 202 have substantially vertical sidewalls 204. To this end, the sidewalls 204 are along a well defined crystalline planes, illustratively vertical <111> planes. Contrastingly, sloping sidewalls 205 are not substantially vertical. This is due to the anisotropic nature of the illustrative wet-etching technique.

In an alternative illustrative embodiment, dry directional etching (e.g. reactive ion etching (RIE)) may be used to form holes completely through substrate 200. The substrate, which is masked in areas outside of the holes is exposed to an anisotropic etchant. The etchant etches the sidewalls of the holes result in the structure shown in FIG. 2. Because the etchant has access to the hole sidewalls, the etching step is completed rapidly. This illustrative method results in exceptionally thin freestanding layers having accurate thicknesses.

Freestanding layers 202 illustratively comprise the substrates of optical filters. To this end, a plurality of thin-dielectric films may be disposed on either side of freestanding layers 202 to form the optical filter (e.g. the optical filter shown in cross-section in FIG. 1). Because the freestanding layer 202 is but one layer in the optical filter, the thickness and index of refraction of this layer must be considered in the overall design of the filter. As such, the thickness 206 of freestanding layer is dictated by the particular type of optical filter being fabricated. Moreover, the index of refraction of freestanding layer must be accounted for in the design. For example, the freestanding layer 202 is illustratively silicon. Because silicon has a relatively high index of refraction, it may be a layer of "high" refractive index material in a high-low-high . . . stack. However, silicon may have too great of an index of refraction. As such, it may be useful to thermally oxidize freestanding layer 202 of silicon to form $SiO_2$, which has a lower index of refraction than silicon.

With the freestanding layers having been formed, the deposition of the desired number of dielectric layers to form the dielectric stack of the optical filters is carried out. Again, the outer surfaces of freestanding layers 202 are conformally coated with the dielectric layers to produce optical filters such as optical filter 100 of the illustrative embodiment in FIG. 1.

FIG. 3 is a top view of a plurality of optical filters 301 formed by the illustrative etching and deposition techniques described above. The wafer 300 illustratively forms a carrier for the optical filters 301. Often, it is desirable to use the individual optical filters 301. As such, it is necessary to remove the filters 301 from the wafer 300. This may be done, for example, according to the illustrative technique shown in FIGS. 3(b)-3(d). To this end, dicing saw cuts 302 and 303 may be made by standard technique. The cut portion is then removed, and the plurality of optical filters 301 having a holding frame 304 of the wafer 300 remains. This is as shown in FIG. 3(c). Thereafter, the individual optical filters 301 are selectively removed by a standard cleaving technique as shown. The resultant filter 301 shown freestanding in FIG. 3(e) is a relatively small size precision optical filter. Alternatively, a subsequent dicing saw cut may be made. In this illustrative embodiment, each individual optical filter 301 would have a separate carrier 306 made of a portion of holding frame 304. The filters may be separated from the wafer by a second dicing saw cut, or by laser cutting.

Figure 3A:
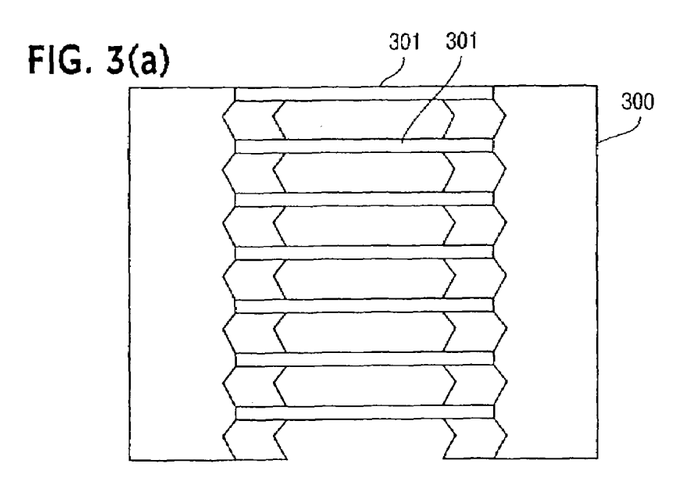
FIGS. 3(a)-3(e) are cross-sectional views of an illustrative fabrication sequence in accordance with an exemplary embodiment of the present invention.
Figure 3B:
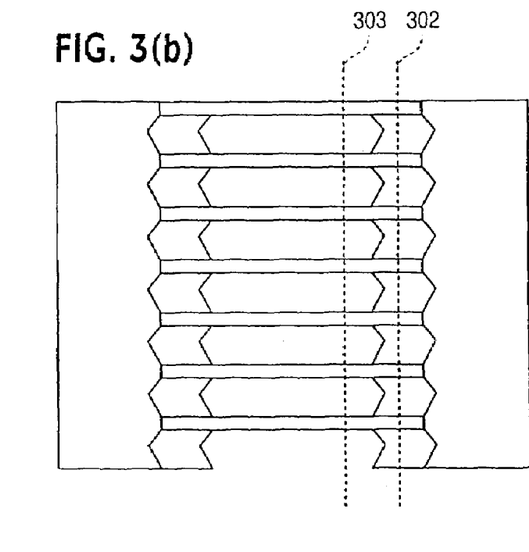
Figure 3C:
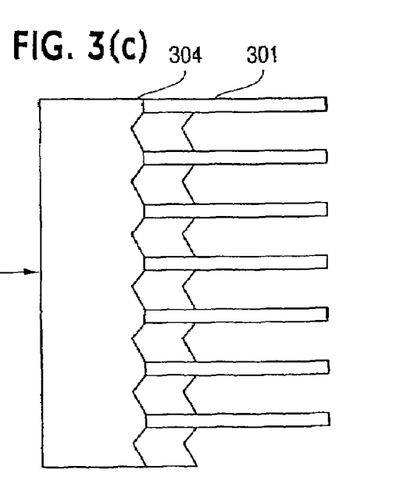
Figure 3D:
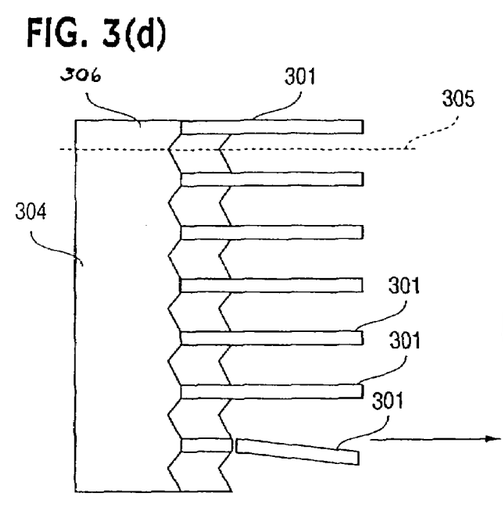
Figure 3E:
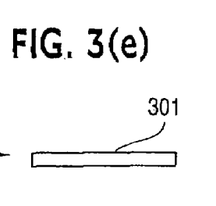

The separated filters typically have a size of approximately 0.1 mm to approximately 1.0 mm in width and approximately 1.0 mm to approximately 5.0 mm in length. Advantageously, thousands of the optical filters 301 may be formed from a single wafer. Moreover, batch-mode fabrication will facilitate large scale manufacture of precision optical filters.

Figure 4:
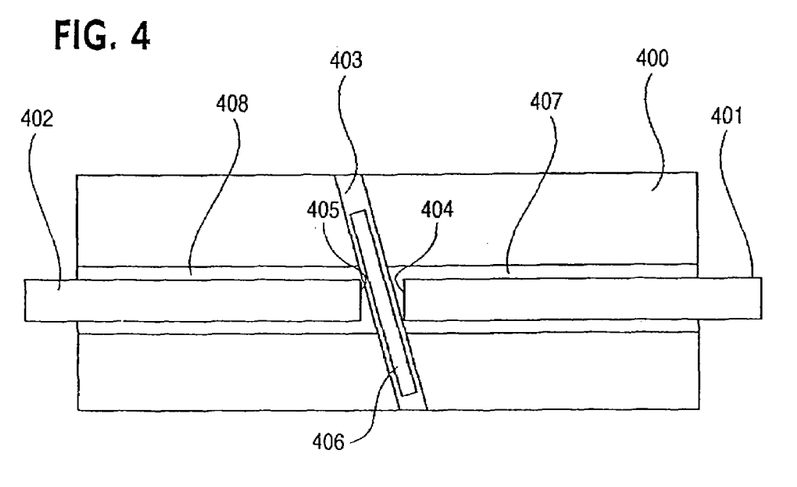
FIG. 4 is a top view of an optical fiber-optical fiber coupling incorporating an optical filter in accordance with an exemplary embodiment of the present invention.

FIG. 4 shows a top view of an optical fiber-optical fiber connection. An optical filter 406 in accordance with an illustrative embodiment of the present invention is disposed between optical fibers 401 and 402. A substrate 400 includes a first optical fiber 401 and a second optical fiber 402. Optical fibers 401 and 402 are illustratively disposed in grooves 407 and 408 of substrate 400. The substrate 400 has a groove 403 which is illustratively at an offset angle relative to endfaces 404 and 405 of optical fibers 401 and 402, respectively.

As can be readily appreciated by one having ordinary skill in the art, optical filter 406 in the illustrative embodiment of FIG. 4 may provide a variety of filtering functions. For purposes of illustration and not limitation, the filter 406 may be useful in preventing back reflections in optical fibers 401 and 402. Filter 406 may also be used as a narrow-band or wide-band filter to permit the transmission of certain wavelength from one optical fiber to another.

Figure 5A:
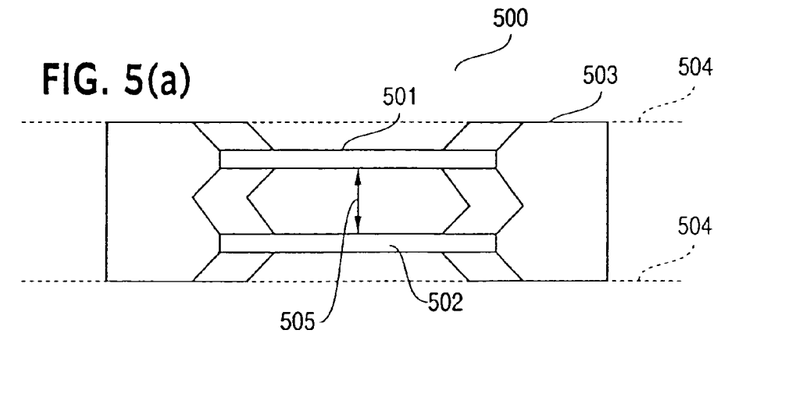
FIGS. 5(a)-5(c) are top views of optical etalons in accordance with an illustrative embodiment of the present invention.
Figure 5B:
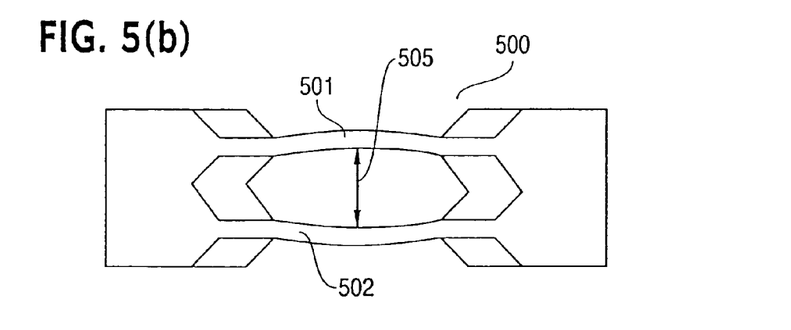
Figure 5C:
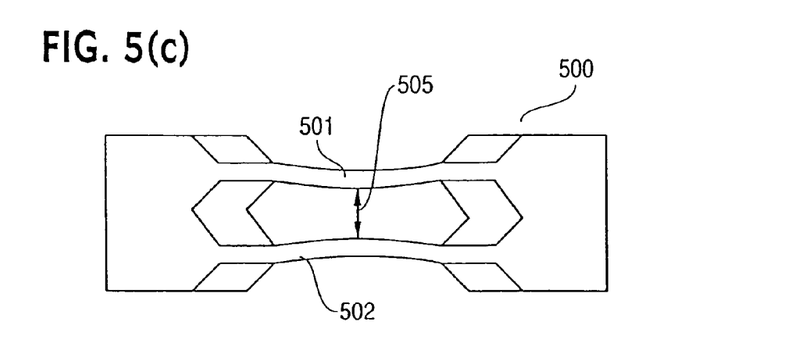
Figure 6A:
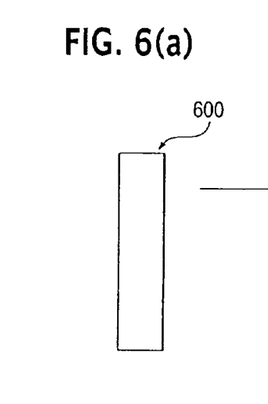
FIGS. 6(a)-6(f) are cross-sectional views of an illustrative fabrication sequence of an etalon in accordance with an exemplary embodiment of the present invention.
Figure 6B:
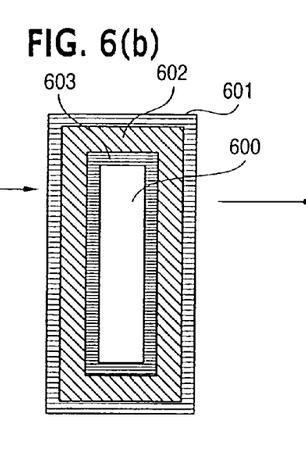
Figure 6C:
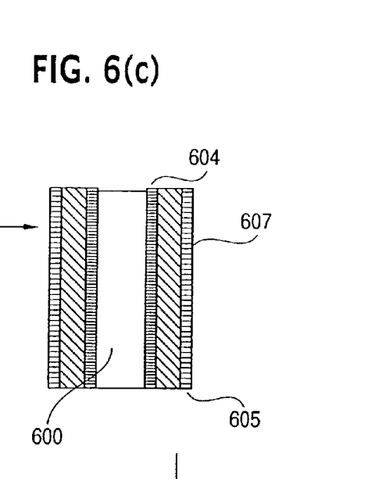
Figure 6D:
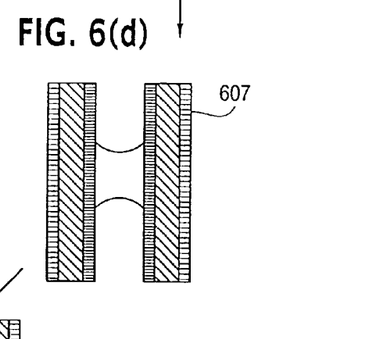
Figure 6E:
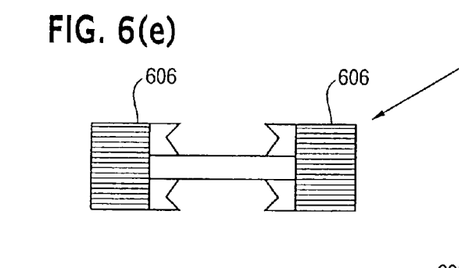
Figure 6F:
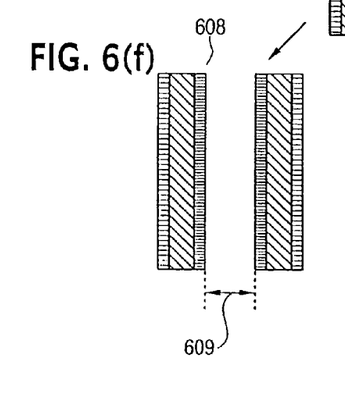
Figure 7A:
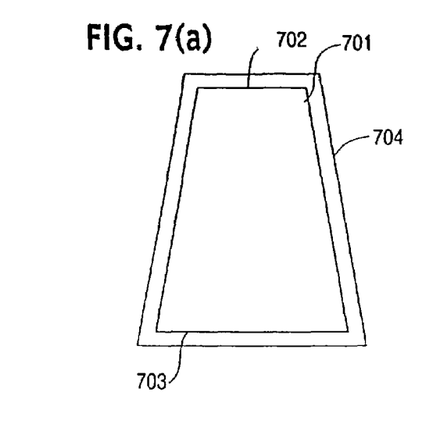
FIGS. 7(a)-7(f) are cross-sectional views of optical filters having angled side surfaces in accordance with an illustrative embodiment of the present invention.
Figure 7B:
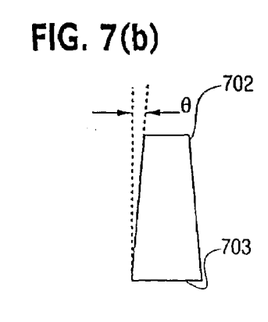
Figure 7C:
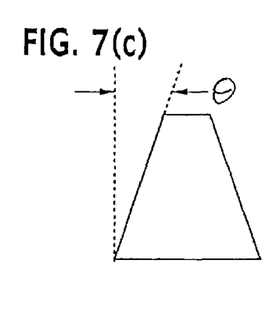
Figure 7D:
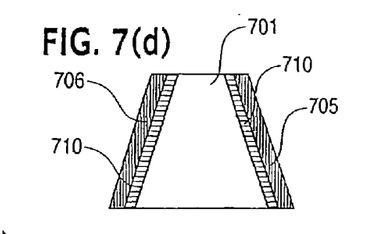
Figure 7E:
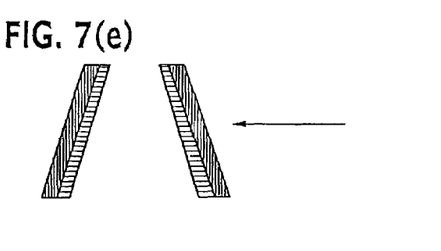
Figure 7F:
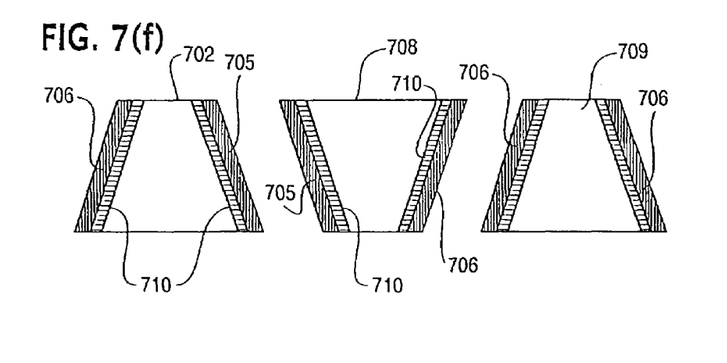

FIGS. 5(a)-5(c) show illustrative embodiments of the present invention drawn to etalons. FIG. 5(a) shows two filters 501 and 502 cut from the same wafer 503. The two filters are separated by a spacing 505, and form an etalon 500. As can be readily appreciated, the etalon 500 is readily manufacturable by a slight variation in the illustrative fabrication sequence described in connection with FIGS. 2 and 3(a)-3(d). To this end, the etalon 500 may be fabricated by dicing the wafer horizontally, for example, along lines 504. Because of the precision lithography and chemical etching used to fabricate the freestanding layers, a cavity length 505 between filters 501 and 502 may be readily selected for specific applications. Thus, because cavity length 505 of the etalons may be very precisely determined, mass production of precision etalons may be realized by virtue of the illustrative embodiment.

FIGS. 5(*b*) and 5(*c*) show a slight variation on the illustrative embodiment of FIG. 5(*a*). To this end, the illustrative embodiments shown in FIGS. 5(*b*) and 5(*c*) show an etalon 500 which may be tuned by varying the spacing 505 between the filters 501 and 502. Of course, changing the spacing 505 will change the center wavelength and filter width of the etalons 500, thereby enabling its tuning. This tuning may be affected by voltage control of the etalons 500 by the electrostatic actuation or repulsion of the filters 501 and 502. The electrostatic actuation may be achieved by depositing and optically transparent conductive material such as a doped layer of silicon on the filters 501 and 502. Electrostatic voltage may be applied to control the spacing 505.

FIGS. 6(*a*)-6(*f*) show an illustrative embodiment in which the freestanding layer is used to form an etalon cavity having a thickness defined by the thickness of the freestanding layer. FIG. 6(*a*) shows a freestanding layer 600 formed according to the illustrative techniques described above.

FIG. 6(*b*) shows the freestanding layer 600 with dielectric layers 601, 602 and 603 disposed thereover. Dielectric layers 601, 602 and 603 may be single or multiple dielectric layers formed by deposition techniques described above.

As shown in FIG. 6(*c*), the top and bottom surfaces 604 and 605, respectively, are planarized to expose the freestanding layer 600 as shown.

As shown in FIG. 6(*e*), a mask 606 is disposed over portions of the filter 607 not to be etched, and the freestanding layer 600 is selectively etched using an isotropic etchant; as shown in FIG. 6(*d*). Areas not to be etched include the top and bottom surfaces of the wafer which are masked as shown at 606 in FIG. 6(*e*).

Finally, turning to FIG. 6(*f*), the etalon 608 is shown. The etalons cavity length 609 is defined by the original thickness of the freestanding layer 600. As was the case in the illustrative embodiment of FIGS. 5(*b*) and 5(*c*), it may be advantageous to alter the cavity length 609 electrostatically by the deposition of an optically transparent conductive material and application of a voltage.

FIGS. 7(*a*)-7(*f*) show another illustrative embodiment of the present invention. As before, a monocrystalline silicon (e.g. <110> top surface) wafer is illustratively used. The freestanding layers, such as those fabricated in accordance with the illustrative embodiments above, may be etched to have a substantially trapezoidal cross-sectional shape. Illustratively, freestanding layer 701 shown in FIG. 7(*a*) may have a substantially trapezoidal cross-sectional shape. The top portion 702 of the freestanding layer 701 has a narrower width than the bottom portion 703 because it is exposed to an anisotropic chemical etchant (e.g. a wet etchant such as KOH in the case of <110> silicon) for the longest duration during etching. The dielectric stack 704 may be disposed over the freestanding layer 701 by the illustrative techniques describe above. As can be readily appreciated by one having ordinary skill in the art, the etchants, which are highly selective against <111> plane produce silicon layers that are substantially rectangular.

As shown in FIG. 7(*b*), the angle θ, which is indicative of the degree of width differential between the top surface 702 and the bottom surface 703, may be relatively small.

Contrastingly, this angle may be made substantially larger, for example, as shown in FIG. 7(*c*). To achieve a greater angle θ, for example as shown in FIG. 7(*c*), etchants that etch <111> planes rapidly produce silicon layers that are substantially trapezoidal. As can be appreciated, the angle θ can be accurately controlled by selecting the appropriate chemical etchant for the particular material of the freestanding layer 701. Control of the angle θ provides a control of the relative orientation of dielectric stacks 704 applied to the opposed sidewalls 710 of the freestanding layer 701.

FIG. 7(*d*) shows the application of dielectric stacks 705 and 706 to a freestanding layer 701. The freestanding layer 701 is illustratively a trapezoidal silicon layer having angle side surfaces as shown. The filter shown in FIG. 7(*d*) is substantially the same as that shown in FIG. 7(*a*), with the exception that the top surface 702 and bottom surface 703 have been removed.

As shown in FIG. 7(*e*), the freestanding layer 701 may be removed by selective isotropic etching. The angle of the coatings can be selected to provide certain desired optical properties. For example, the angle of the coatings may be selected to provide polarization-dependent characteristics or frustration of etalon cavity effects. Of course, these are merely illustrative, and other application of angle dielectric stacks may be realized in accordance with the illustrative embodiment of the present invention.

Finally, turning to FIG. 7(*f*), alternating trapezoids 707, 708 and 709 having first and second dielectric stacks 705 and 706 disposed thereover may be fabricated in accordance with the above illustrative techniques by forming the freestanding layers 701 by etching from both the top and bottom of the monocrystalline substrate. For example, the illustrative structure shown in FIG. 7(*f*) may be fabricated by etching from both sides of substrate 200 shown in the illustrative embodiment of FIG. 2. The trapezoids 707, 708 and 709 having alternating orientations may be used for a variety of applications.

Finally, according to another exemplary embodiment, the freestanding layers are supported only at one end. This may be effected by etching or sawing the substrate (wafer) so that only one end of the freestanding layer is attached to the substrate. This illustrative embodiment may be useful if the dielectric layers have thermal expansion coefficients(s) significantly different from the substrate.

The invention being thus described, it would be obvious that the same may be varied in many ways by one of ordinary skill in the art having had the benefit of the present disclosure. Such variations are not regarded as a departure from the spirit and scope of the invention, and such modifications as would be obvious to one skilled in the art are intended to be included within the scope of the following claims and their legal equivalents.

What is claimed is:

1. A method of fabricating optical filters comprising:
providing a substrate;
etching said substrate to farm a plurality of freestanding layers; and
depositing a plurality of dielectric layers over an outer surface of each of said freestanding layers,
wherein the method forms an optical filter.

2. A method as recited in claim 1, further comprising removing said freestanding layers and said plurality of dielectric layers from said substrate.

3. A method as recited in claim 1, wherein said substrate is silicon.

4. A method as recited in claim 1, wherein said freestanding layers have side surfaces in defined crystalline planes.

5. A method as recited in claim 1, wherein said depositing is carried out using a method of the group consisting essentially of: ALD, CVD), LPCVD, PECVD and MOCVD.

6. A method as recited in claim 1, wherein said plurality of dielectric layer further comprises 10 to 100 layers.

7. A method as recited in claim 1, wherein said substrate is monocrystalline silicon.

8. A method as recited in claim 1, wherein said substrate has a <110> top surface.

9. A method as recited in claim 1, wherein said freestanding layers have sidewalls in the <111> crystalline plane.

10. A method as recited in claim 9, wherein said planes are substantially vertical.

11. A method as recited in claim 9, wherein said freestanding layers have a substantially trapezoidal cross-section.

12. A method as recited in claim 1, wherein said plurality of dielectric layers is chosen from the group consisting essentially of aluminum oxide, titanium oxide, silicon oxide, cesium oxide and tantalum oxide.

13. A method as recited in claim 1, wherein said freestanding layers are silicon and the method further comprises oxidizing said silicon prior to depositing said plurality of dielectric layers.

14. A method of fabricating an optical etalon, the method comprising:
providing a substrate;
selectively etching said substrate to form at least two substantially parallel freestanding layers and handles; and
depositing a plurality of dielectric layers over an outer surface of said freestanding layers,
wherein the method fonna an optical etalon.

15. A method as recited in claim 14, wherein said freestanding layers have side surfaces in defined crystalline planes.

16. A method as recited in claim 14, wherein said depositing is carried out using a method of the group consisting essentially of: ALD, CVD, LPCVD, PECVD and MOCVD.

17. A method as recited in claim 14, wherein a distance between said at least two freestanding layers is substantially fixed.

18. A method as recited in claim 14, wherein a distance between said at least two freestanding layers is variable.

19. A method as recited in claim 18, further comprising depositing a layer of transparent conductive material over said at least two freestanding layers.

20. A method as recited in claim 14, wherein said plurality of dielectric layers is chosen from the group consisting essentially of aluminum oxide, titanium oxide, silicon oxide, cesium oxide and tantalum oxide.

21. A method of fabricating an etalon, the method comprising:
providing a substrate;
selectively etching said substrate to form at least one freestanding layer;
depositing a plurality of dielectric layers over said at least one freestanding layer on opposed sidewalls of said freestanding layer; and
removing said freestanding layer,
wherein the method forms an etalon.

22. A method as recited in claim 21, wherein said at least one freestanding layer has a thickness, and said thickness equals a spacing of the etalon.

23. A method as recited in claim 21, wherein said sidewalls are in defined crystalline planes.

24. A method as recited in claim 21, wherein said sidewalls are substantially parallel.

25. A method as recited in claim 1, wherein said etching further comprises dry etching a plurality of hales through said substrate followed by anisotropically etching said holes.

26. A method as recited in claim 25, wherein said anisotropic etching is a wet etching step.

* * * * *